United States Patent [19]

Anderson et al.

[11] Patent Number: 4,708,229
[45] Date of Patent: Nov. 24, 1987

[54] DOUBLE ACTING CLUTCH

[75] Inventors: Andrew G. Anderson, London; Leigh A. Shoji, Chatham, both of Canada

[73] Assignee: Canadian Fram Limited, Chatham, Canada

[21] Appl. No.: 892,530

[22] Filed: Jul. 31, 1986

[51] Int. Cl.⁴ .................. F16D 25/11; F16D 23/14
[52] U.S. Cl. ........................... 192/87.17; 192/88 A
[58] Field of Search ............ 192/48.91, 70.27, 87.17, 192/87.19, 91 A, 86, 91 R, 85 AA, 87.14, 88 R, 88 A

[56] References Cited

U.S. PATENT DOCUMENTS

| | | | |
|---|---|---|---|
| 2,919,778 | 1/1960 | Aschauer | 192/86 |
| 3,463,284 | 8/1969 | Kampert | 192/88 A |
| 4,549,639 | 10/1985 | Hansen | 192/87.17 X |
| 4,611,698 | 9/1986 | Lehmannn | 192/87.14 X |

Primary Examiner—George H. Krizmanich
Attorney, Agent, or Firm—Markell Seitzman; Russel C. Wells

[57] ABSTRACT

A drive (10) comprising a first (12) and a second (14) pulley rotationally isolated from an input shaft (16), and adapted to be drivingly connected to the input shaft. A plate (40) rotatable with the input shaft (16) and axially movable thereon between a first position in engagement with the first pulley and a second position in engagement with the second pulley (14); a rolling diaphragm (60) supported by one of the pulleys (12) for urging the plate (40) to move into engagement with the other of the pulleys (14), the diaphragm being attached to the one pulley (12) defining an activation chamber (80) therebetween, a controller (134) for communicating and modulating pressurized fluid to the activation chamber (80); and a spring (50) for biasing the plate toward and into engagement with the one pulley.

14 Claims, 1 Drawing Figure

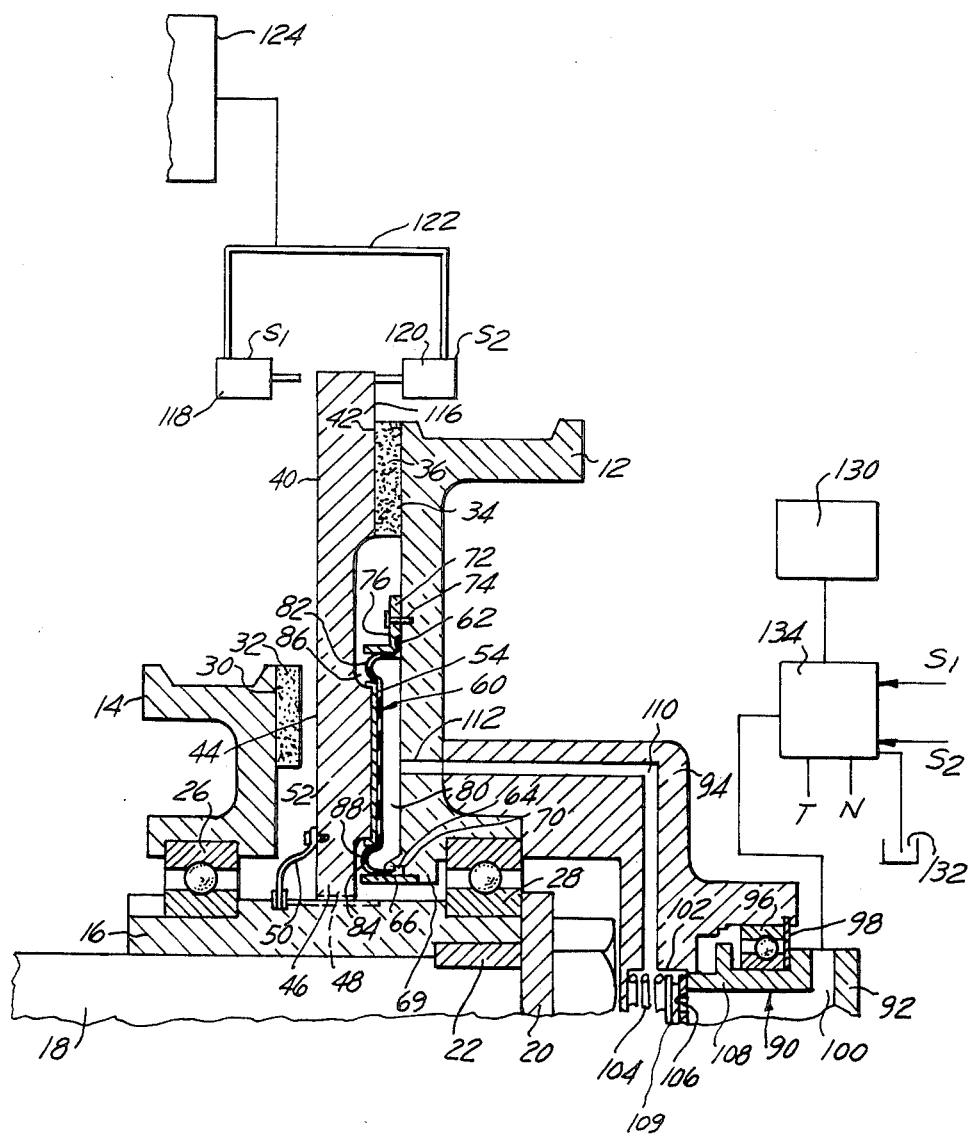

DOUBLE ACTING CLUTCH

BACKGROUND AND SUMMARY OF THE INVENTION

The present invention relates to a double acting drive mechanism capable of operating vehicle accessories at one of either two speed ratios or to totally disengage the accessories from a vehicle engine.

Present day automotive vehicles are typically provided with a number of belt driven engine accessories, such as an air pump, an alternator, a power steering pump and an air conditioning compressor. These accessories exert a parasitic drag on the vehicle engine which is especially evident during periods of vehicle acceleration as well as during periods of engine start-up. This parasitic drag may not be noticeable when considering the larger six or eight cylinder engines; however, it may become a significant factor and distract from engine performance of the smaller three and four cylinder engines now commonly in use.

Accordingly, it is an object of the invention to provide an accessory drive which conserves fuel and increases engine performance by permitting the engine driven accessories to be driven through either of two belt drives one of which provides a high speed of rotation while the other of which provides a lower speed of rotation. Appropriate sensors may be incorporated within the system to sense various engine operating conditions to determine when the lower speed of operation is desirable to cause the clutch to switch between the higher and low speed modes of operation. Further during engine start-up, especially during cold whether operation it may be desirable to momentarily disengage the accessories from the engine to permit same to start quickly in an environment removed from the parasitic drag of the accessories. Accordingly the present invention comprises a drive comprising a first and a second pulley rotationally isolated from an input shaft and adapted to be engagably connected to the input shaft. The drive further includes a plate rotatable with the input shaft and axially movable thereon between a first position in engagement with the first pulley and a second position in engagement with the second pulley; means supported by one of the pulleys for urging the plate to move into engagement with the other of the pulleys, including a rolling diaphragm attached to the one pulley defining an activation chamber therebetween, means for communicating pressurized fluid to the activation chamber; and means for biasing the plate toward and into engagement with the one pulley.

Many other objects and purposes of the invention will be clear from the following detailed description of the drawing.

BRIEF DESCRIPTION OF THE DRAWINGS

In the drawings:

FIG. 1 illustrates a cross sectional view of the present invention.

DETAILED DESCRIPTION OF THE DRAWING

With reference to FIG. 1 there is illustrated a drive 10 capable of rotating one of either of two pulleys 12 and 14 which are attached by drive belts (not shown) to a number of the vehicle accessories in a known manner. An input shaft 16 may be connected to the engine by the bolt 18 and washer 20. The input shaft 16 may be attached to the bolt 18 by splines or alternatively by a key 22. The smaller diameter pulley such as pulley 14 is isolated from the input shaft 16 by a bearing 26. Similarly the larger diameter pulley or a pulley 12 is isolated from the input shaft 16 by another bearing 28. Supported on a lateral face 30 of pulley 14 is an annular ring of friction material 32. Supported on a lateral face 34 of the pulley 12 is another ring of friction material 36. Positioned between the pulleys 12 and 14 is an annular plate 40. The annular plate 40 defines a first engagement surface 42 to receive the friction material 36 and a second engagement face 44 to receive the friction material 32. The plate 40 at its inner end 46 is splined at 48 to the shaft 16 thereby permitting the plate to move axially relative thereto while its rotates with the input shaft 16. Leaf springs such as springs 50 are connected between the input shaft 16 and plate 40 to urge the plate 40 into engagement with the friction material 36. The plate 40 further includes an annular land 52 which is adapted to loosely receive and support a cup shaped, annular piston 54.

The pulley 12 further supports a toroidal or rolling diaphragm 60. The diaphragm includes a first peripheral outer lip 62 and an inner peripheral lip 64. A cap 66 is fitted to the inner end 68 of the pulley 12. Such cap secures the diaphragm and more particularly the inner lip 64 to a groove 70 in the inner end of the pulley 12, thereby providing a fluid seal therebetween. An additional connection between the diaphragm 60 and the pulley 12 is provided by a flanged member 72 which may be attached to the pulley by appropriate fasteners 74. The flanged member 72 or alternatively the pulley 12, at the attachment point of the flanged member 72, may include a groove 76 for receiving the outer lip 62 of the diaphragm 60 thereby providing another fluid tight seal therebetween. In this manner the diaphragm and pulley 12 define a variable volume activation chamber 80. The diaphragm 60 further includes a medial portion 81 which butts against the piston 54. When the drive is in the condition as shown in FIG. 1, the plate 40 drives the pulley 12 and the diaphragm 60 is deflated thereby permitting its outer and inner ends 82 and 84 to roll or to move into the spaces 86 and 88 formed between the annular land 52 the flanged member 72 and the cap 66.

As can be seen from FIG. 1 the pulley 12 is rotationally isolated from the input shaft 16 by the bearing 28 and is selectively rotatable with the input shaft upon engagement with the plate 40.

Since the pulley 12 is free to rotate with the plate 40 upon engagement thereto, and in order to provide pressurized fluid into the activation chamber 80, a rotating union or coupling generally designated as 90 is used. The rotating coupling comprises a first portion 92 fixed to a non-rotating portion of the engine and a rotating portion 94 which may be fabricated as an extension of the pulley 12 or as a separate piece as illustrated in FIG. 1. The first and second portions 92 and 94 respectively are isolated by a bearing 96 having a seal 98 at one end thereof. The first portion 92 is provide with a fluid passage 100 which communicates to a spring cavity 102. Situated in the spring cavity 102 is a spring 104 which biases a valve 106, having an opening 107 therein, against an end 108 of the first portion.

Extending from the spring cavity 102 is another fluid passage 110 which communicates to the activation chamber 80 through another passage 112 within the pulley 12.

Positioned proximate an extension 116 of the plate 40 are a plurality of switches such as micro-switches 118 and 120. These micro-switches are spaced relative to the plate 40 by a bracket 122 which is fixedly attached to the engine 124. The micro-switches 118 and 120 generate, upon activation, switch signals $S_1$ and $S_2$ respectively. These micro-switches are not necessary to the operation of the invention.

Pressurized fuel is communicated to and from passage 100 from a source of pressurized fluid generally designated as 130 and to drain 132 by the operation of a controller 134 which may modulate the fluid pressure. The controller may be responsive to engine parameters such as temperature T, engine speed N, and the switch signals $S_1$ and $S_2$.

As previously mentioned FIG. 1 illustrates the invention in a mode of operation wherein the pulley 12 is connected to the input shaft 16 by virtue of the engagement of the plate 40. In this mode of operation the controller 134 permits the fluid within the activation chamber 80 to be returned to drain 132 enabling the springs 50 to urge the plate 40 to the right (as viewed in FIG. 1) thereby coupling pulley 12 to the input shaft 16. When it is desired to decouple pulley 12 from input shaft and to rotate pulley 14, the controller 134 is activated thereby permitting pressurized fuel to enter the activation chamber 80 which in turn expands the diaphragm 60 urging the piston 54 against the annular land 52 which, as previously mentioned, functions as a piston retainer thereby moving plate 40 into engagement with pulley 14. As the plate 40 traverses the distance between the pulleys 12 and 14 there is a period of time wherein the plate 40 is disengaged from both the pulleys 12 and 14. In this situation both of pulleys 12 and 14 respectively are disengaged from the engine. As such, the accessories connected thereto by appropriate belts are completely decoupled from the engine. This decoupling may be taken advantage of by incorporating within the invention the above mentioned micro-switches 118 and 120. As an example, when the pressure plate 40 is driving pulley 12 the micro-switch 120 may be engaged thereby generating the switch $S_2$. When the plate 40 has moved into contacting engagement with the pulley 14 micro-switch 118 similarly generates the switch signal $S_1$. During the transition interval, that is, when the plate 40 is disconnected from pulleys 12 and 14 both of the micro-switches 118 and 120 will not generate their respective signals. The lack or, alternatively, the absence of the appropriate signals may be utilized by the controller 134 to selectively control the amount of fluid communicated to the activation chamber such that a fluid pressure is generated which is approximately equal and opposite to the biasing force generated by the springs 50 permitting the pressure plate to be maintained decoupled from the pulleys 12 and 14. Thereafter when it is desired to drivingly connect the plate 40 to either of the pulleys 12 and 14 the controller 134 selectively increases or reduces the amount of fuel within the activation chamber thereby selectively driving one or the other pulleys 12 and 14 respectively.

Many changes and modifications in the above described embodiment of the invention can of course be carried out without departing from the scope thereof. Accordingly, that scope is intended to be limited only by the scope of the appended claims.

We claim:
1. A clutch comprising:
 a first and a second pulleys rotationally isolated from an input shaft, and adapted to be drivingly connected to said input shaft;
 a plate rotatable with said input shaft and axially movable thereon between a first position in engagement with said first pulley and a second position in engagement with said second pulley;
 means supported by one of said pulleys for urging said plate to move into engagement with the other of said pulleys, including a rolling diaphragm attached to said one pulley defining an activation chamber therebetween, and said means for communicating and modulating pressurized fluid to said activation chamber; and
 bias means for biasing said plate toward and into engagement with said one pulley.

2. The device as defined in claim 1 wherein said urging means further includes an annular piston support, coaxially disposed relative to said input shaft, extending from one side of said plate and an annular, cup-shaped piston received onto said piston support, said piston, opposite said piston support, loosely engaging a medial portion of said diaphragm.

3. The device as defined in claim 1 wherein said biasing means includes a spring connected between said input shaft and said plate.

4. The device as defined in claim 3 wherein said urging means further includes a rotating coupling comprising a non-rotating first portion adapted to communicate with a source of pressurized fluid and a second portion rotatable with said one pulley for communicating fluid between said activation chamber and said first portion.

5. The device as defined in claim 1 wherein said urging means further includes controller means interposing said first portion and the source of pressurized fluid, operable in response to at least one operating parameter for communicating pressurized fluid to said first portion for urging said plate from said one pulley and for venting fluid from said activation chamber to a drain, thereby reducing the pressure in said activation chamber to permit said biasing means to move said plate toward said one pulley.

6. The device as defined in claim 5 wherein when said plate is disengaged from both said pulleys, said pulleys are effectively rotationally disengaged from said input shaft.

7. The device as defined in claim 5 further including means for sensing the axial motion of said plate and for generating a signal indicative of the fact that said plate is disengaged from both pulleys and wherein said controller means is responsive to said signal to modulate the fluid within said activation chamber to maintain said plate disengaged.

8. The device as defined in claim 7 wherein said first and second pulleys each support friction material for frictionally engaging said plate.

9. The device as defined in claim 8 wherein the diameter of said first pulley is larger than the diameter of said second pulley.

10. A clutching device comprising:
 first and second pulleys rotationally isolated from an input shaft;
 a clutch plate positioned between said pulleys and adapted to rotate a particular one of said pulleys, said plate rotatable with said input shaft and axially movable relative thereto;

pressure activated means positioned between said plate and one of said pulleys for receiving pressurized fluid and for moving said plate into engagement with the other of said pulleys;

biasing means, positioned between said plate and said other pulley for engaging said other pulley toward said one pulley.

11. The device as defined in claim 10 wherein said pressure activated means includes a rolling diaphragm and a controller for communicating pressurized fluid to said diaphragm.

12. The device as defined in claim 10 wherein said pressure activated means further includes means for sensing when said plate is in engagement or not in engagement.

13. A clutch comprising:

a first and a second pulleys rotationally isolated from an input shaft, and adapted to be drivingly connected to said input shaft;

a plate rotatable with said input shaft and axially movable thereon between a first position in engagement with said first pulley and a second position in engagement with said second pulley;

means supported by one of said pulleys for urging said plate to move into engagement with the other of said pulleys, including a rolling diaphragm attached to said one pulley defining an activation chamber therebetween, means for rotationally isolating said rolling diaphragm from said plate and means for communicating and modulating pressurized fluid to said activation chamber; and bias means for biasing said plate toward and into engagement with said one pulley.

14. The device as defined in claim 13 wherein said rotationally isolating means further includes an annular piston support, coaxially disposed relative to said input shaft, extending from one side of said plate and an annular, cup-shaped piston received onto said piston support, said piston, opposite said piston support, loosely engaging a medial portion of said diaphragm.

* * * * *